(12) United States Patent
Radford

(10) Patent No.: US 6,662,739 B1
(45) Date of Patent: Dec. 16, 2003

(54) ROPE HITCH

(75) Inventor: Wayne Michael Radford, 29 Cathedral Avenue, Molendina, QLD 4214 (AU)

(73) Assignees: Wayne Michael Radford, Molendinar (AU); Maria Elisabeth Cunnington, Molendinar (AU)

( * ) Notice: Subject to any disclaimer, the term of this patent is extended or adjusted under 35 U.S.C. 154(b) by 0 days.

(21) Appl. No.: 10/018,975

(22) PCT Filed: May 25, 2000

(86) PCT No.: PCT/AU00/00555

§ 371 (c)(1),
(2), (4) Date: May 20, 2002

(87) PCT Pub. No.: WO00/73131

PCT Pub. Date: Dec. 7, 2000

(30) Foreign Application Priority Data

May 28, 1999 (AU) .............................................. 32289/99

(51) Int. Cl.[7] .............................................. B63B 21/04

(52) U.S. Cl. ...................................... 114/218; 24/136 K

(58) Field of Search ............... 24/136 K; 410/101–103; 114/218

(56) References Cited

U.S. PATENT DOCUMENTS 1,369,842 A  *  3/1921  Schaffernocker

FOREIGN PATENT DOCUMENTS

| AU | 16132/95 | 3/1995 |
|----|----------|--------|
| WO | 99/08925 | 2/1999 |
| WO | 99/56035 | 11/1999 |

* cited by examiner

Primary Examiner—Ed Swinehart
(74) Attorney, Agent, or Firm—Renner, Otto, Boisselle & Sklar, LLP

(57) ABSTRACT

A rope hitch (1) to facilitate the tie down and/or tensioning of ropes (11) in various situations is provided with a cam locking system and a rope block (6). Ropes attached to the hitch can be tensioned and shortened with minimal effort.

6 Claims, 3 Drawing Sheets

ROPE HITCH

TECHNICAL FIELD

The present invention relates to rope tensioners and hitches of the type which can be used to tie down, support or haul loads.

BACKGROUND ART

There are many currently available rope tensioning devices and hitches for tensioning ropes, load support and for hauling a range from elaborate lever type devices to more simply constructed tensioners. Such devices are commonly used in the transportation and yachting fields and the cost of these products varies.

Whilst most trade and transport industry workers are able to competently secure loads using devices and secure knotting techniques the general public's ability to tie an adequate knot for the purpose of securing and tensioning ropes and loads is often somewhat limited. This can lead to potentially dangerous on-road situations as in busy traffic if a load or part of a load is lost there is a high risk of an accident occurring.

It is an object of the present invention to provide a rope hitch which is simple to use, which can be used for tensioning a rope, supporting or hauling a load and which relieves the pressures on tie down points.

Further objects and advantages of the present invention will become apparent from the ensuing description which is given by way of example only.

DISCLOSURE OF INVENTION

According to the present invention there is provided a rope hitch comprising a mounting plate, opposed cam plates mounted on a major surface of the mounting plate, a wedge fixed between the cam plates, and a rope block mounted on the major surface of the mounting plate in a position adjacent to the cam plates and the wedge, the arrangement being such that a rope can be secured in a passages created between adjacent edges of the wedge and the cam plates and passed over the block to tension and lock same with respect to remote tie-down or fixture points.

The cam plates and wedge can each have two principal edges meeting at an acute angle.

The wedge can be mounted and slidable on a mounting pin extending from the major surface of the mounting plate.

Corners of the cam plates wedge and rope block can be chamfered.

The wedge can be provided with a elongated pin slot which allows it to slide on the mounting pin to widen or narrow the passages between the cam plates and wedge to cater for different sizes of rope.

The block may be in form of a rope pulley.

The edges of the wedge, cam plates and the block can be fluted.

BRIEF DESCRIPTION OF THE DRAWINGS

Aspects of the present invention will now be described with reference to the accompanying drawings in which.

Figure 1:
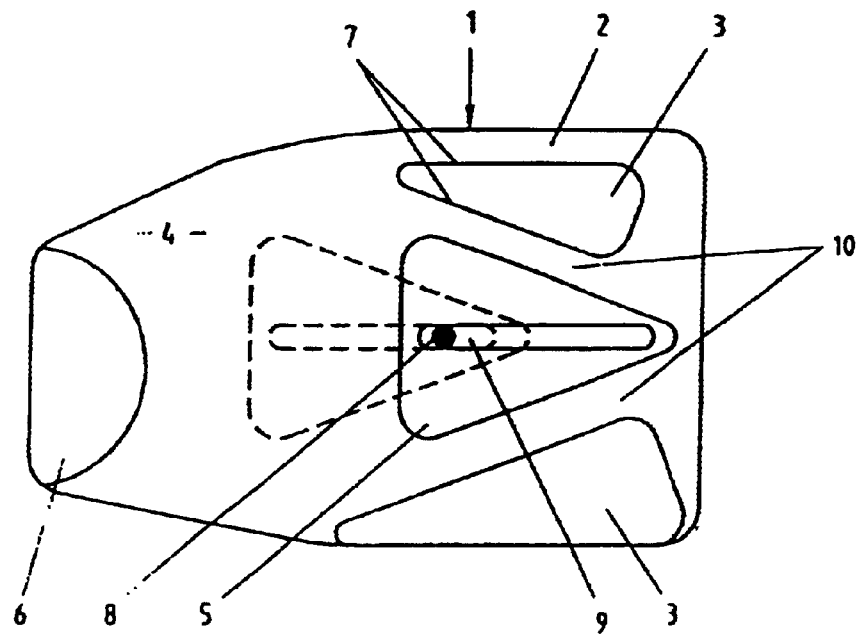
FIGS. 1 and 2 are plan and perspective views of a hitch in accordance with one possible embodiment of the present invention.

With respect to the drawings the present invention provides a rope hitch generally indicated by arrow 1, the hitch comprising a mounting plate 2, opposed cam plates 3 mounted on one major surface 4 of the mounting plate 2, a wedge 5 fixed between the cam plates 3 and a rope block 6, mounted on the major surface 4 of the mounting plate 2 adjacent to the cam plates and wedge.

The cam plates 3 and wedge are provided with two principle edges 7 meeting at an acute angle.

The wedge 5 is mounted to the mounting plate 2 by a pin 8 and is a sliding fit on the pin by virtue of an elongate slot 9 in the wedge. This arrangement allows the passages 10 between the cam plates 3 and the wedge 5 to be narrowed or widened to accommodate different sized ropes.

Figure 2:
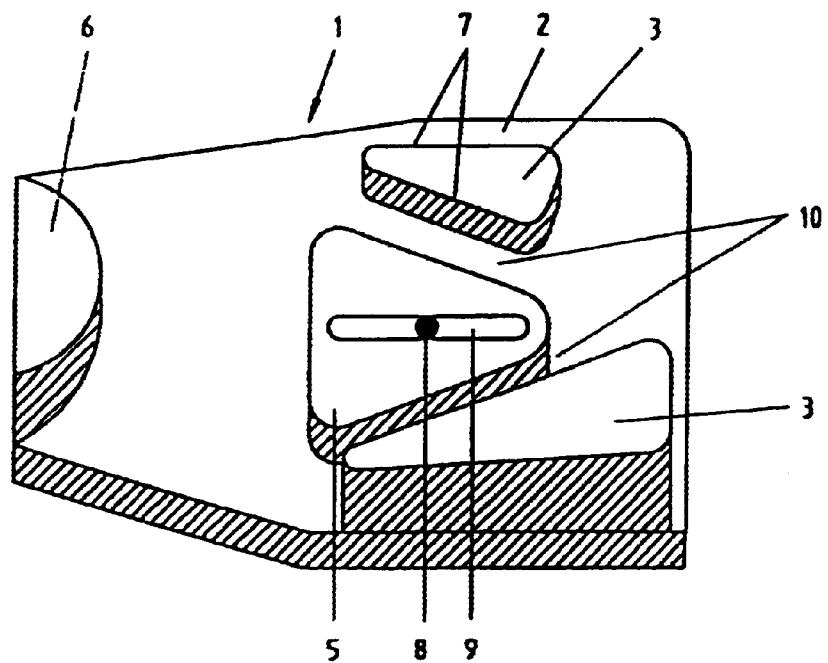
Figure 3:
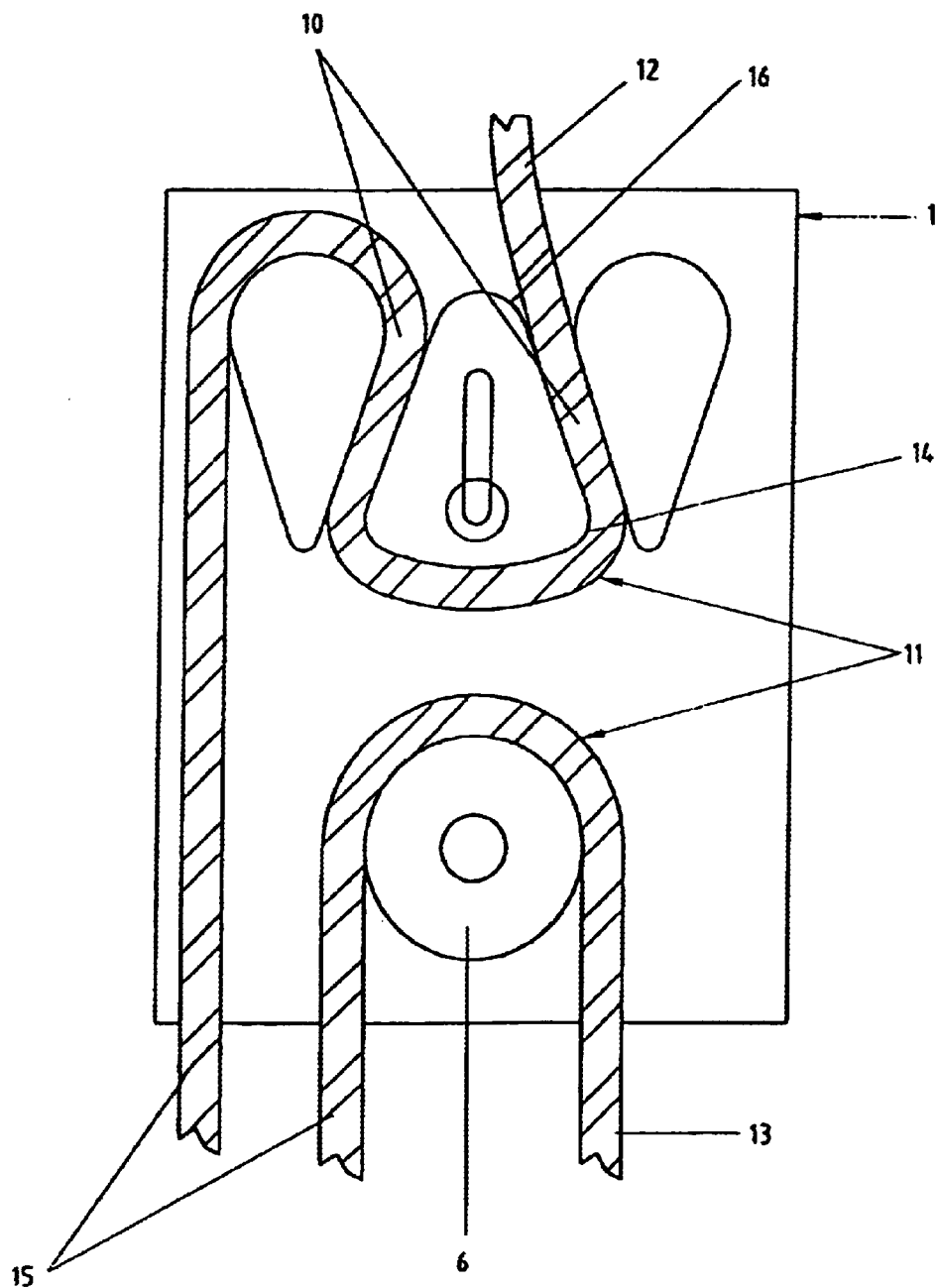
FIG. 3 is a plan view of the hitch of FIGS. 1 and 2 having a rope engaged therewith.

The block 6 can be in the form of a semi-circular protrusion from the mounting plate (FIGS. 1 and 2) or a pulley wheel (FIG. 3).

The edges of the cam plates 3, wedge 5 and block 6 can be fluted (not shown) to provide a rope channel and chamfered corners as indicated to assist with the translation of a rope.

FIG. 3 of the drawings illustrates the manner in which a rope generally indicated by arrow 11 can be engaged with the hitch 1. Free ends 12 and 13 of the rope 11 are secured to remote attachment points by making an appropriate ties. A portion 14 of the free end 12 of the rope 11 is placed in the passages 10 and a further portion 15 looped around a fixture such as a tie off rail of a vehicle and returned over the block 6 and then end 13 is secured to a further remote tie position of a vehicle.

To tension the rope end 13 can be loosened and then tensioned. When the rope is loosened the wedge 5 marginally rotates in a anti-clockwise direction and when the rope is tensioned after a partial clockwise rotation the apex end 16 of the wedge 5 engages and locks the rope.

Figure 4:
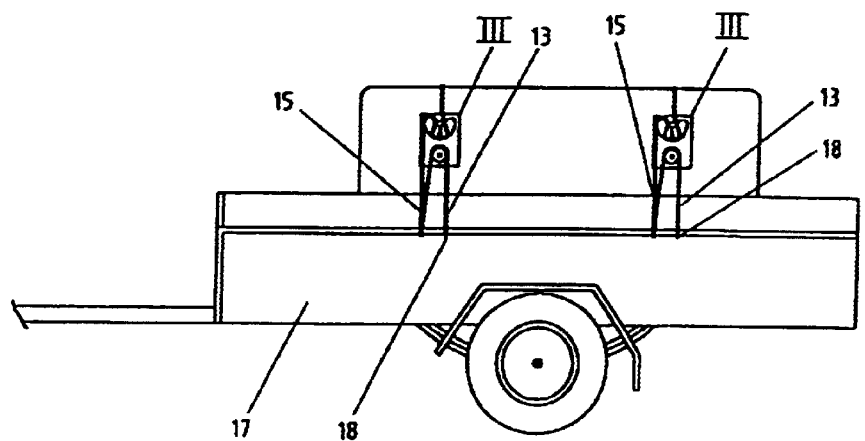
FIG. 4 is a side view of the hitches of the present invention in use for securing a load.

FIG. 4 of the drawings illustrates the use of hitches to secure a load on a box trailer 17. The hitch positions indicated are the most convenient. The encircled illustrations of the hitches 1 marked III show the rope path described in relation to FIG. 3 with the ends of the rope being secured to the trailer tie down bar at 18.

Figure 5:
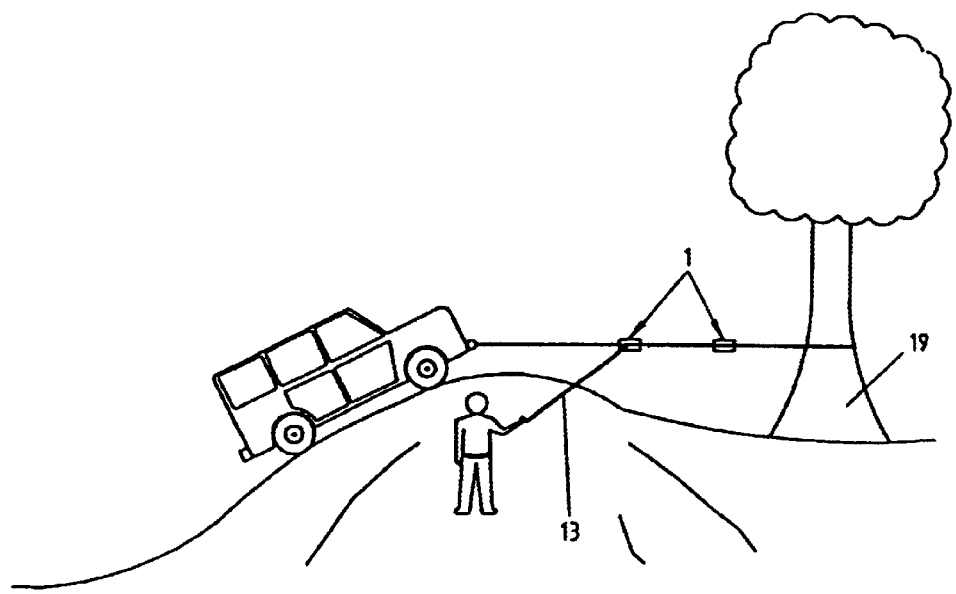
FIG. 5 is a side view of the hitches of the present invention in use in a vehicle recovery situation.

FIG. 5 of the drawings illustrates how two hitches in series can be used in a vehicle recovery situation. In this case free end 13 of the rope is used for primary leverage and a recovery can be made with respect to a fixture such as tree 18, or another vehicle or fixture (not shown).

The present invention provides a rope hitch which because of its inherent mechanical advantages allows a rope to be tensioned or a load to be supported or moved with minimal effort and increased safety as tension in the rope is largely centered on the hitch and not tie down positions.

Aspects of the present invention have been described by way of example only and it should be appreciated that modifications and additions may be made thereto without departing from the scope thereof as defined in the appended claims.

What is claimed is:

1. A rope hitch comprising a mounting plate, opposed cam plates mounted on a major surface of the mounting plate, a wedge fixed between the cam plates, and a rope block mounted on the major surface of the mounting plate in a position adjacent to the cam plates and the wedge the arrangement being such that a rope can be secured in a passages created between adjacent edges of the wedge and the cam plates and passed over the block to tension and lock same with respect to remote tie-down or fixture points.

2. A rope hitch as claimed in claim 1 wherein the cam plates and wedge each have two principal edges meeting at an acute angle.

3. A rope hitch as claimed in claim 2 wherein the wedge is mounted and slidable on a mounting pin extending from the major surface of the mounting plate.

4. A rope hitch as claimed in claim 1 wherein corners of the wedge and rope block are chamfered.

5. A rope hitch as claimed in claim 2 wherein the wedge is provided with an elongated pin slot which allows it to slide on the mounting pin to widen or narrow the passages between the cam plates and the wedge to cater for different sizes of rope.

6. A rope hitch as claimed in claim 1 wherein the rope block is in the form of a rope pulley.

* * * * *